(12) United States Patent
Fu et al.

(10) Patent No.: US 12,507,285 B2
(45) Date of Patent: Dec. 23, 2025

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventors: Zhe Fu, Guangdong (CN); Shukun Wang, Guangdong (CN)

(73) Assignee: GUANGDONG OPPO MOBILE TELECOMMUNICATIONS CORP., LTD., Guangdong (CN)

(\*) Notice: Subject to any disclaimer, the term of this patent is extended or adjusted under 35 U.S.C. 154(b) by 407 days.

(21) Appl. No.: 18/145,183

(22) Filed: Dec. 22, 2022

(65) Prior Publication Data

US 2023/0129426 A1    Apr. 27, 2023

Related U.S. Application Data

(63) Continuation of application No. PCT/CN2020/100270, filed on Jul. 3, 2020.

(51) Int. Cl.
*H04W 74/0833* (2024.01)
*H04W 48/16* (2009.01)
*H04W 74/00* (2009.01)

(52) U.S. Cl.
CPC ....... *H04W 74/0841* (2013.01); *H04W 48/16* (2013.01); *H04W 74/0833* (2013.01); *H04W 74/004* (2013.01)

(58) Field of Classification Search
CPC ............ H04W 74/0841; H04W 48/16; H04W 74/004; H04W 48/12; H04W 48/18; H04W 74/0833; H04W 76/27; H04W 74/006
See application file for complete search history.

(56) References Cited

U.S. PATENT DOCUMENTS

| | | | | |
|---|---|---|---|---|
| 11,265,779 | B2* | 3/2022 | Han | H04W 74/004 |
| 12,213,186 | B2* | 1/2025 | Xiong | H04W 74/004 |
| 12,238,783 | B2* | 2/2025 | Narasimha | H04W 72/0446 |
| 12,256,436 | B2* | 3/2025 | Zhang | H04W 52/362 |
| 2018/0192445 | A1 | 7/2018 | Jiang | |
| 2018/0317264 | A1* | 11/2018 | Agiwal | H04W 74/085 |

(Continued)

FOREIGN PATENT DOCUMENTS

| | | |
|---|---|---|
| CN | 106412905 | 2/2017 |
| CN | 109792657 | 5/2019 |

(Continued)

OTHER PUBLICATIONS

3GPP TSG-RAN WG2 #101 Tdoc R2-1802635 Atens, Greece, Feb. 26-Mar. 2, 2018 Title Signalling aspects of network slicing (Year: 2018).*

(Continued)

*Primary Examiner* — Nizar N Sivji
(74) *Attorney, Agent, or Firm* — Hodgson Russ LLP

(57) ABSTRACT

A wireless communication method and a terminal device are provided. The method includes the following. A terminal device transmits first slice-related information to a network device, where the first slice-related information is carried in a random access procedure, and the first slice-related information indicates whether the terminal device supports a network slice and/or indicates a network slice supported by the terminal device.

15 Claims, 5 Drawing Sheets

(56) References Cited

U.S. PATENT DOCUMENTS

| | | | | |
|---|---|---|---|---|
| 2019/0174406 A1* | 6/2019 | Hwang | ................ | H04W 36/08 |
| 2019/0320314 A1* | 10/2019 | Yang | ..................... | H04W 40/12 |
| 2021/0051753 A1* | 2/2021 | Ohlsson | ............... | H04W 76/19 |
| 2021/0377847 A1* | 12/2021 | Yang | ..................... | H04W 48/08 |
| 2022/0086765 A1* | 3/2022 | Zhang | ................... | H04W 52/16 |
| 2022/0110085 A1* | 4/2022 | Khoryaev | ............. | H04L 5/0051 |
| 2022/0124571 A1 | 4/2022 | Jung et al. | | |
| 2022/0140881 A1* | 5/2022 | Zhang | ................... | H04L 5/0051 370/329 |
| 2022/0167424 A1* | 5/2022 | Zhang | ................. | H04W 52/146 |
| 2022/0183064 A1* | 6/2022 | Talarico | ............ | H04W 74/0816 |
| 2022/0279595 A1* | 9/2022 | Jang | .................. | H04W 74/0841 |
| 2022/0400421 A1 | 12/2022 | Hong | | |
| 2024/0015784 A1 | 1/2024 | Cheng et al. | | |
| 2024/0023168 A1 | 1/2024 | Gao et al. | | |
| 2024/0114440 A1 | 4/2024 | Park et al. | | |

FOREIGN PATENT DOCUMENTS

| | | | | |
|---|---|---|---|---|
| CN | 110679179 | | 1/2020 | |
| CN | 112042225 | | 12/2020 | |
| CN | 112055421 | | 12/2020 | |
| EP | 3493601 | | 6/2019 | |
| EP | 3589064 | | 1/2020 | |
| WO | 2018059494 | | 4/2018 | |
| WO | 2018086060 | | 5/2018 | |
| WO | 2018142200 | | 8/2018 | |
| WO | 2018231139 | | 12/2018 | |
| WO | 2019140629 | | 7/2019 | |
| WO | 2019192022 | | 10/2019 | |
| WO | 2020092059 | | 5/2020 | |
| WO | WO-2020092059 A1 * | 5/2020 | ......... | H04B 7/18506 |
| WO | 2021077267 | | 4/2021 | |
| WO | 2021183870 | | 9/2021 | |
| WO | WO-2021239899 A1 * | 12/2021 | ....... | H04L 27/26025 |

OTHER PUBLICATIONS

Design and Experimental Validation of a Software-Defined Radio Access Network Testbed with Slicing Support—Apr. 2019 (Year: 2019).*

EPO, Extended European Search Report for EP Application No. 20943401.8, May 31, 2023.

"3rd Generation Partnership Project; Technical Specification Group Radio Access Network; NR; NR and NG-RAN Overall Description; Stage 2 (Release 17)," 3GPP TS 38.300, Mar. 2022, v17.0.0.

"3rd Generation Partnership Project; Technical Specification Group Radio Access Network; NR; Medium Access Control (MAC) protocol specification (Release 17)," 3GPP TS 38.321, Mar. 2022, v17.0.0.

"3rd Generation Partnership Project; Technical Specification Group Radio Access Network; NR; Radio Resource Control (RRC) protocol specification (Release 17)," 3GPP TS 38.331, Mar. 2022, v17.0.0.

ETSI MCC, "Report of 3GPP TSG RAN2#98 meeting, Hangzhou, China," 3GPP TSG-RAN WG2 meeting #99, R2-1707601, Aug. 2017.

Ericsson, "Signalling aspects of network slicing," 3GPP TSG-RAN WG2 #101, Tdoc R2-1802635 (revision of R2-1713276), Feb. 2018.

Ericsson, "Signalling aspects of network slicing", 3GPP TSG-RAN WG2 # AH1801, Tdoc R2-1800377 (resubmission of R2-1713276), Jan. 2018.

WIPO, International Search Report and Written Opinion for International Application No. PCT/CN2020/100270, Mar. 22, 2021.

CNIPA, First Office Action for CN Application No. 202310327511.3, Jul. 19, 2024.

CNIPA, Second Office Action issued in CN Application No. 202310327511.3, Nov. 19, 2024.

EPO, Communication for EP Application No. 20943401.8, Feb. 9, 2024.

WIPO, International Search Report and Written Opinion for International Application No. PCT/CN2021/091963, Feb. 8, 2022.

EPO, Extended European Search Report for EP Application No. 21939654.6, Apr. 16, 2024.

Qualcomm Incorporated, "Slice specific cell reselection," 3GPP TSG RAN WG2 Meeting #113bis-e, R2-2102696, Apr. 2021.

"3rd Generation Partnership Project; Technical Specification Group Ran; NR; Study on enhancement of Radio Access Network (RAN) slicing (Release 17)," 3GPP TR 38.832, Mar. 2021, v1.0.0.

"3rd Generation Partnership Project; Technical Specification Group Radio Access Network; NR; User Equipment (UE) procedures in Idle mode and RRC Inactive state (Release 16)," 3GPP TS 38.304, Mar. 2021, v16.4.0.

Intel Corporation, "Summary of [AT113b-e][251][NR] Slice-specific cell reselection (Intel), " 3GPP TSG-RAN WG2 Meeting #113b-e, draft-R2-2104321, Apr. 2021.

CMCC, "Summary for [AT113bis-e][252][NR] Slice-specific Rach," 3GPP TSG-RAN WG2 Meeting #113bis-e, R2-2104322, Apr. 2021.

USPTO, Non-Final Office Action for U.S. Appl. No. 18/224,737, filed Oct. 8, 2025.

* cited by examiner

WIRELESS COMMUNICATION METHOD AND TERMINAL DEVICE

CROSS-REFERENCE TO RELATED APPLICATION(S)

This application is a continuation of International Application No. PCT/CN2020/100270, filed Jul. 3, 2020, the entire disclosure of which is hereby incorporated by reference.

TECHNICAL FIELD

This disclosure relates to the field of communication, and more particularly relates to a wireless communication method and a terminal device.

BACKGROUND

A network slice (slicing) consists of a radio access network (RAN) part and a core network (CN) part. As to a RAN slice, a network device can obtain information of a network slice required by a terminal device only after message (Msg) 5 is received. However, the network slice required by the terminal device may not be a network slice supported by the network device, or may be overloaded although supported by the network device. In this case, the network device can only transmit a radio resource control (RRC) connection release message once Msg 5 is received, such that the terminal device reselects a suitable cell, which leads to service delay of the terminal device.

SUMMARY

In a first aspect, a wireless communication method is provided. The method includes the following. A terminal device transmits first slice-related information to a network device, where the first slice-related information is carried in a random access procedure, and the first slice-related information indicates whether the terminal device supports a network slice and/or indicates a network slice supported by the terminal device.

In a second aspect, a wireless communication method is provided. The method includes the following. A network device receives first slice-related information transmitted by a terminal device, where the first slice-related information is carried in a random access procedure, and the first slice-related information indicates whether the terminal device supports a network slice and/or indicates a network slice supported by the terminal device.

In a third aspect, a terminal device is provided. The terminal device includes a transceiver, a processor, and a memory. The memory is configured to store computer programs. The processor is configured to invoke and execute the computer programs stored in the memory, to perform the method described in the first aspect or in various implementations of the first aspect.

DETAILED DESCRIPTION

The following will describe technical solutions of implementations of the disclosure with reference to the accompanying drawings in implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

Implementations of the disclosure provide a wireless communication method, a terminal device, and a network device, which can reduce service delay of a terminal device.

Implementations of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a universal mobile telecommunication system (UMTS), a wireless local area network (WLAN), a wireless fidelity (WiFi), a next-generation communication system, or other communication systems.

Generally speaking, a conventional communication system generally supports a limited quantity of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication, etc. Implementations of the disclosure can also be applied to these communication systems.

Optionally, a communication system in implementations of the disclosure may be applied to a carrier aggregation (CA) scenario, a dual connectivity (DC) scenario, or a standalone (SA) network deployment scenario.

There is no limitation on the type of spectrum in implementations of the disclosure. For example, implementations of the disclosure are applicable to a licensed spectrum, and also applicable to an unlicensed spectrum.

Figure 1:
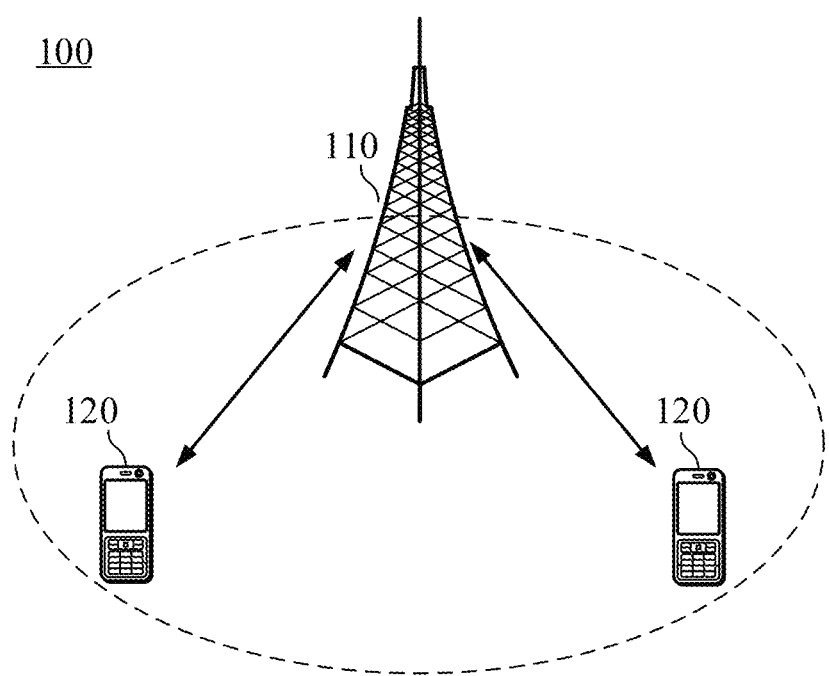
FIG. 1 is a schematic architectural diagram of a communication system provided in implementations of the disclosure.

Exemplarily, FIG. 1 illustrates a communication system 100 to which implementations of the disclosure are applied. The communication system 100 may include a network device 110. The network device 110 may be a device that can communicate with a terminal device 120 (also referred to as "communication terminal" or "terminal"). The network device 110 can provide a communication coverage for a specific geographical area and communicate with terminal devices in the coverage area.

FIG. 1 exemplarily illustrates one network device and two terminal devices. Optionally, the communication system 100 may also include multiple network devices, and there can be other quantities of terminal devices in a coverage area of each of the network devices. Implementations of the disclosure are not limited in this regard.

Optionally, the communication system 100 may further include other network entities such as a network controller, a mobile management entity, or the like, and implementations of the disclosure are not limited in this regard.

It should be understood that, in implementations of the disclosure, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be elaborated again herein. The communication device may further include other devices such as a network controller, a mobile management entity, or other network entities in the communication system 100, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

Various implementations of the disclosure are described in connection with the terminal device and the network device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, etc. The terminal device may be a station (ST) in a WLAN, a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, and a next-generation communication system, for example, a terminal device in an NR network, or a terminal device in a future evolved public land mobile network (PLMN), etc.

By way of explanation rather than limitation, in implementations of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

The network device may be a device configured to communicate with a mobile device, and the network device may be an access point (AP) in a WLAN, a base transceiver station (BTS) in GSM or CDMA, may also be a Node B (NB) in WCDMA, and may also be an evolutional Node B (eNB or eNodeB) in LTE, or a relay station or AP, or an in-vehicle device, a wearable device, a network device or g-Node B (gNB) in an NR network, a network device in a future evolved PLMN, etc.

In implementations of the disclosure, the network device provides services for a cell, and the terminal device communicates with the network device through a transmission resource (for example, a frequency-domain resource or a spectrum resource) for the cell. The cell may be a cell corresponding to the network device (for example, a base station). The cell may correspond to a macro base station, or may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

Before introducing technical solutions of the disclosure, the following will firstly introduce a 4-step random access procedure, a 2-step random access procedure, and a network slice.

It is to be noted that, a random access procedure may be triggered by the following events:
(1) Establishment of a wireless connection in initial access. For example, the terminal device needs to transition from radio resource control (RRC)_IDLE to RRC_CONNECTED. In this case, the terminal device can trigger initial access.
(2) RRC connection re-establishment procedure, so that the terminal device re-establishes a wireless connection after radio link failure.
(3) Handover: In this case, the terminal device is in a connected state. The terminal device needs to establish uplink (UL) synchronization with a target cell.
(4) Downlink (DL) or UL data arrival during RRC_CONNECTED when UL synchronization status is "non-synchronized".
(5) UL data arrival during RRC_CONNECTED when there are no available physical uplink control channel (PUCCH) resources for scheduling request (SR).
(6) SR failure.
(7) Request by RRC upon synchronous reconfiguration.
(8) Transition from RRC_INACTIVE of the terminal device.
(9) To establish time alignment at secondary cell (SCell) addition.
(10) Request for other system information (OSI) by the terminal device.
(11) The terminal device requires beam failure recovery.
(12) RRC resume request during RRC_INACTIVE.

Figure 2:
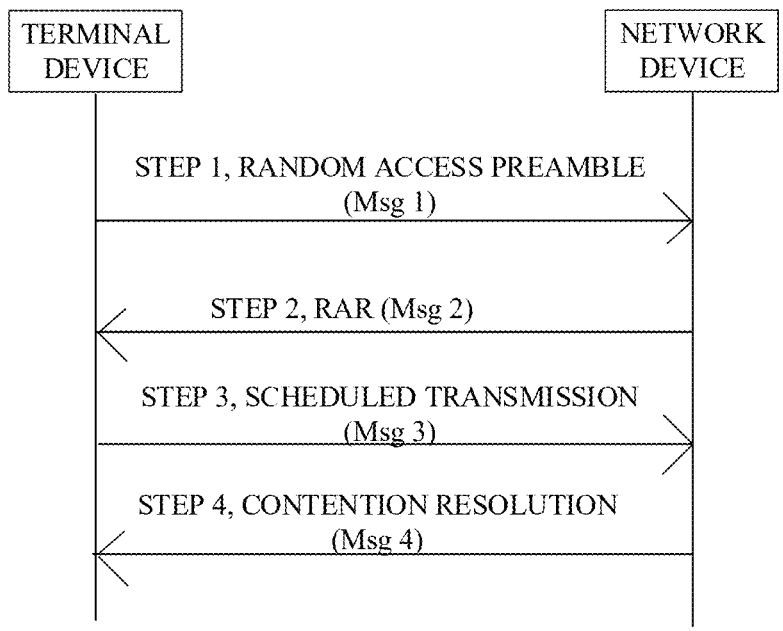
FIG. 2 is a schematic flowchart of a contention-based random access procedure provided in implementations of the disclosure.

In an NR system, two types of random access are supported: a contention-based random access and a contention-free random access. The following will give a brief introduction to a contention-based 4-step random access. As illustrated in FIG. 2, a 4-step random access includes the following.

Step 1, a terminal device transmits a random access preamble (that is, message (msg) 1) to a network device.

The random access preamble may also be referred to as a preamble, a random access preamble sequence, a preamble sequence, etc.

Specifically, the terminal device can select a physical random access channel (PRACH) resource, where the PRACH resource may include a time-domain resource, a frequency-domain resource, and a code-domain resource. The network device transmits a random-access related parameter to the terminal device by broadcasting system information block (SIB) 1. A reference signal receiving power (RSRP) threshold for a synchronization signal block (SSB) (rsrp-ThresholdSSB) in a random-access common configuration information element (IE) (RACH-Config-Common IE) is used for the terminal device to perform SSB selection. The terminal device compares an RSRP measurement result of each SSB with rsrp-ThresholdSSB, and selects an SSB with a measurement value above a configured threshold (i.e. rsrp-ThresholdSSB) for access. If no SSB satisfies the configured threshold, the terminal device randomly selects one of all SSBs to access. Each SSB corresponds to one set of random access preamble resources and random access occasion (RACH occasion, RO) resources. The terminal device randomly selects a contention-based random access resource (i.e. random access preamble) corresponding to the selected SSB, and sets a preamble index (PREAMBLE_INDEX) to the selected random access preamble. The network device can estimate a transmission delay between the network device and the terminal device according to the preamble and align UL timing accordingly, and can also determine roughly a resource size required by the terminal device for transmission of Msg 3. In order for the network device to know more accurately the size of Msg 3 to-be-transmitted and allocate a suitable UL resource accordingly, preambles are categorized into preamble group A and preamble group B. If preamble group B exists in the random access resource, the terminal device can select from the preamble group according to the size of Msg 3 and pathloss.

Step 2, the network device transmits a random access response (RAR) (that is, Msg 2) to the terminal device.

After the preamble is transmitted to the network device, the terminal device can start a random access response window (ra-ResponseWindow). In the ra-ResponseWindow, the terminal device detects a corresponding physical downlink control channel (PDCCH) according to a random access radio network temporary identifier (RA-RNTI). If the PDCCH scrambled by the RA-RNTI is detected, the terminal device can obtain a physical downlink shared channel (PDSCH) scheduled by the PDCCH, where the PDSCH contains an RAR corresponding to the preamble.

The RA-RNTI is obtained by calculating a time-frequency location of a PRACH for transmitting the preamble. Therefore, if multiple terminal devices transmit preambles on the same RO, RARs corresponding thereto are multiplexed in the same RAR media access control protocol data unit (MAC PDU). If a PDCCH scrambled by an RA-RNTI corresponding to an RO resource for preamble transmission is successfully received by the terminal, and the RAR contains a MAC subPDU carrying a random access preamble identifier (RAPID) corresponding to the selected PREAMBLE_INDEX of the Msg 1, it is considered that the RAR is successfully received. The terminal can decode to obtain a timing advance command (TAC), a UL grant, and a temporary cell radio network temporary identity (TC-RNTI) for Msg 3 transmission.

If the PDCCH scrambled by the RA-RNTI corresponding to the RO resource for preamble transmission is not received before the ra-ResponseWindow expires, or the PDCCH scrambled by the RA-RNTI is received but the RAR does not contain the MAC subPDU corresponding to the PREAMBLE_INDEX, it is considered that the RAR is not successfully received. In this case, if the number of preamble transmissions does not exceed a maximum number configured by a network (preambleTransMax), the terminal device needs to retransmit the Msg 1. If the number of preamble transmissions exceeds the preambleTransMax, the terminal device reports a random access problem to an upper layer.

Step 3, the terminal device transmits Msg 3.

Once an RAR message is received, the terminal device determines whether the RAR is an RAR message for the terminal device. For example, the terminal device can check according to the preamble index. Once determining that the received RAR message is the RAR message for the terminal device, the terminal device can generate Msg 3 at an RRC layer and transmit the Msg 3 to the network device, where the Msg 3 carries an identity (ID) of the terminal device, etc.

The Msg 3 is mainly used for notifying the network device which event has triggered the random access. For different random-access triggering events, the Msg 3 transmitted by the terminal device in step 3 may contain different contents.

For example, for an initial access scenario, the Msg 3 may contain an RRC connection request (RRC setup request) message generated at the RRC layer. In addition, the Msg 3 may further carry, for example, a 5G serving-temporary mobile subscriber identity (S-TMSI) of the terminal device, or a random number, etc.

For another example, for an RRC connection reestablishment scenario, the Msg 3 may contain an RRC connection reestablishment request message generated at the RRC layer. In addition, the Msg 3 may further carry, for example, a cell radio network temporary identifier (C-RNTI), etc.

For another example, for a handover scenario, the Msg 3 may contain an RRC handover confirm message which is generated at the RRC layer and carries a C-RNTI of the terminal device. In addition, the Msg 3 may further carry, for example, a buffer status report (BSR), etc. For other triggering events such as UL/DL data arrival, the Msg 3 at least may contain a C-RNTI of the terminal device.

Step 4, the network device transmits a contention resolution message (that is, Msg 4) to the terminal device.

The network device transmits Msg 4 to the terminal device. The terminal device receives the Msg 4 correctly to complete contention resolution. For example, in an RRC connection establishment procedure, the Msg 4 may carry an RRC connection establishment message.

Since the terminal device can carry a unique ID of the terminal device in the Msg 3 in step 3, in a contention resolution mechanism, the network device will carry a unique terminal-device ID in the Msg4 to indicate a terminal device that is successful in the contention, while other terminal devices that failed in the contention resolution will initiate random access again.

It should be understood that, in implementations of the disclosure, contention resolution may be in the following two manners:

1. If a C-RNTI is carried in Msg 3 by the terminal device, Msg 4 can be scheduled by a C-RNTI scrambled PDCCH.
2. If no C-RNTI is carried in Msg 3 by the terminal device, for example, in initial access, Msg 4 can be scheduled by a TC-RNTI scrambled PDCCH. In this case, contention resolution may be as follows: the terminal device receives a PDSCH of the msg4 to obtain a contention resolution ID, and compares the contention resolution ID with a common control channel (CCCH) service data unit (SDU) in the Msg 3 to determine whether the contention is resolved.

A 2-step random access procedure is studied in standardization of NR release (Rel) 16. Compared with a 4-step random access procedure in Rel-15, a 2-step random access can reduce signaling overhead while reducing delay. Currently, steps of a 2-step random access are as follows.

1. A terminal transmits Msg A to a network, where the Msg A includes Msg 1+Msg3 in a 4-step random access.

2. The network transmits Msg B to the terminal, where the Msg B includes Msg2+Msg4 in a 4-step random access. After Msg A transmission, the terminal starts a reception window for the Msg B, and monitors for and receives the Msg B within the reception window.

For a 4-step random access procedure, after Msg 1 transmission, the terminal device monitors for an RA-RNTI scrambled PDCCH within an RAR window (ra-ResponseWindow) to receive a corresponding RAR. If no RAR is received by the UE within the window, it is considered that the random access is not successful, and the terminal device will retransmit the Msg 1. When the number of Msg 1 transmissions by the terminal device reaches a threshold, the terminal device will indicate a random access problem to a higher layer. The ra-ResponseWindow starts at a first PDCCH resource (occasion) after Msg 1 transmission of the terminal device. A window length of the ra-ResponseWindow is configured by the network, and the ra-ResponseWindow can support a window length of up to 10 milliseconds (ms).

Similarly, the terminal device will also start a reception window for Msg B after Msg A transmission. The terminal device monitors for Msg B from the network within the reception window. If no Msg B is received by the terminal device within the reception window, the terminal device considers the random access not successful.

A network slice consists of a radio access network (RAN) part and a core network (CN) part. Different network slices have different network slice selection assistance information (NSSAI).

The support of network slices by a network relies on the principle that data communication for different slices and different transmission-performance requirements (such as reliability, transmission delay, and transmission rate) is handled by different PDU sessions.

For example, a network will handle enhance mobile broadband (eMBB) services and ultra-reliable and low latency communication (URLLC) services by different PDU sessions, where each PDU session may have multiple quality of service (QoS) flows.

In DL, with a CN non-access stratum (NAS) service data flow (SDF) template, different packets from an application layer are classified and mapped onto different QoS flows in different PDU sessions, and transmitted to a RAN by different PDU sessions. The RAN maps the packets onto different data radio bearers (DRB) according to IDs of the QoS flows and transmits to a UE on an air interface. Similarly, for UL data, similar operations can be applied.

As described above, for a RAN slice, the network device can obtain information of a network slice required by the terminal device only after Msg 5 (that is, a first DL message after a random access procedure, such as an RRC connection setup complete message) is received. However, the network slice required by the terminal device may not be a network slice supported by the network device, or may be overloaded although supported by the network device. In this case, the network device can only transmit an RRC connection release message once Msg 5 is received, such that the terminal device reselects a suitable cell, which leads to service delay of the terminal device.

In order to solve the above technical problem, in the disclosure, the terminal device transmits to the network device information of whether the terminal device supports a network slice and/or a network slice supported by the terminal device in a random access procedure, thereby solving the above technical problem.

The following will elaborate the technical solutions of the disclosure in connection with implementations.

Figure 3:
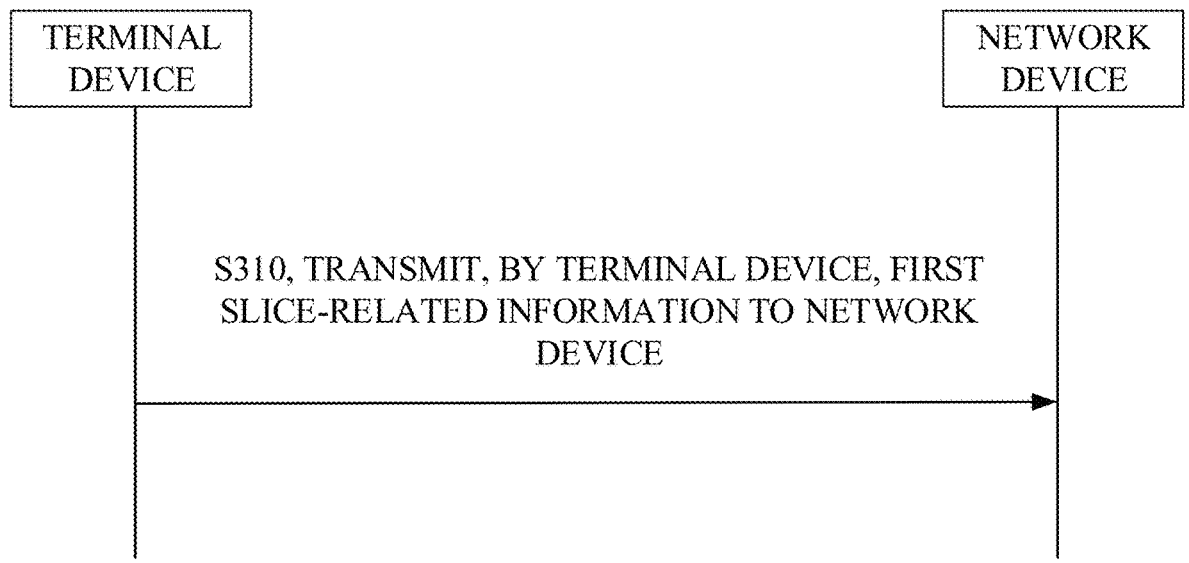
FIG. 3 is an interaction flowchart of a wireless communication method provided in an implementation of the disclosure.

FIG. 3 is an interaction flowchart of a wireless communication method provided in an implementation of the disclosure. The method includes the following.

Step S310, a terminal device transmits first slice-related information to a network device.

The first slice-related information is carried in a random access procedure.

The first slice-related information indicates whether the terminal device supports a network slice and/or indicates a network slice supported by the terminal device.

Optionally, the first slice-related information may be transmitted by a NAS layer of the terminal device to an access stratum (AS) layer of the terminal device, or may be determined by the AS according to service requirements or the like.

Optionally, "the first slice-related information is carried in the random access procedure" means that the first slice-related information is directly carried in the random access procedure or indirectly (that is, implicitly) carried in the random access procedure.

Exemplarily, the first slice-related information is carried in Msg 3 or Msg A in the random access procedure, or the first slice-related information is extra indication information in the Msg 3 or the Msg A. These are cases where the first slice-related information is directly carried in the random access procedure.

Exemplarily, different first slice-related information corresponds to different random access resources, or different first slice-related information corresponds to different sizes of the Msg 3 or different sizes of the Msg A in the random access procedure. These are cases where the first slice-related information is indirectly carried in the random access procedure.

The following will exemplify the case where the first slice-related information is carried in the Msg 3 or the Msg A in the random access procedure.

Optionally, the first slice-related information is a CCCH ID in the Msg 3 or the Msg A, that is, a CCCH ID corresponding to a CCCH SDU.

Optionally, the CCCH ID is a CCCH logical channel identifier (LCID).

Optionally, the CCCH ID is related to the first slice-related information, that is, different first slice-related information corresponds to different CCCH IDs. For example, if the first slice-related information indicates that the terminal device supports a network slice, the CCCH LCID carried in the Msg 3 or the Msg A is A. If the first slice-related information indicates that the terminal device does not support a network slice, the CCCH LCID carried in the Msg 3 or the Msg A is B. If the first slice-related information indicates that the terminal device supports network slice m, the CCCH LCID carried in the Msg 3 or the Msg A is C. If the first slice-related information indicates that the terminal device supports network slice n, the CCCH LCID carried in the Msg 3 or the Msg A is D.

The following will exemplify the case where the first slice-related information is the extra indication information in the Msg 3 or the Msg A.

Optionally, the extra indication information may be an extra flag in the Msg 3 or the Msg A.

The flag indicates whether the terminal device supports a network slice. If the flag has a first value, it indicates that the terminal device supports a network slice. If the flag has a second value, it indicates that the terminal device does not support a network slice. The first value may be 0 and the second value may be 1, or the first value may be 1 and the second value may be 0.

Or the flag indicates that the terminal device does not support a network slice, or indicates an ID of a network slice supported by the terminal device. For example, if the flag has a value of 0, it indicates that the terminal device does not support a network slice. If the flag has a value of m, it indicates that the terminal device supports network slice m. If the flag has a value of n, it indicates that the terminal device supports network slice n.

The following will exemplify the case where the first slice-related information is carried in the Msg 1 or the Msg A in the random access procedure.

Exemplarily, different first slice-related information corresponds to different random access resources, or different first slice-related information corresponds to different random access resources in the random access procedure. These are cases where the first slice-related information is indirectly carried in the random access procedure.

The following will exemplify the case where different first slice-related information corresponds to different random access resources.

Optionally, the random access resource includes at least one of a time-domain resource, a frequency-domain resource, or a code-domain resource for a PRACH, or a preamble. The time-domain resource and/or the frequency-domain resource for a PRACH is an RO resource.

Exemplarily, if the first slice-related information indicates that the terminal device supports a network slice, an RO resource used by the terminal device is RO resource 1. If the first slice-related information indicates that the terminal device does not support a network slice, the RO resource used by the terminal device is RO resource 2. If the first slice-related information indicates that the terminal device supports network slice m, the RO resource used by the terminal device is RO resource 3. If the first slice-related information indicates that the terminal device supports network slice n, the RO resource used by the terminal device is RO resource 4.

Exemplarily, if the first slice-related information indicates that the terminal device supports a network slice, an RO resource used by the terminal device is RO resource 1. If the first slice-related information indicates that the terminal device does not support a network slice, the RO resource used by the terminal device is RO resource 2.

Exemplarily, if first slice-related information indicates that the terminal device supports a network slice, a PRACH frequency-domain resource used by the terminal device is frequency-domain resource 1. If the first slice-related information indicates that the terminal device does not support a network slice, the PRACH frequency-domain resource used by the terminal device is frequency-domain resource 2. If the first slice-related information indicates that the terminal device supports network slice m, the PRACH frequency-domain resource used by the terminal device is frequency-domain resource 3. If the first slice-related information indicates that the terminal device supports network slice n, the PRACH frequency-domain resource used by the terminal device is frequency-domain resource 4.

Exemplarily, if the first slice-related information indicates that the terminal device supports a network slice, a PRACH code-domain resource used by the terminal device is code-domain resource 1. If the first slice-related information indicates that the terminal device does not support a network slice, a PRACH code-domain resource used by the terminal device is code-domain resource 2. If the first slice-related information indicates that the terminal device supports network slice m, the PRACH code-domain resource used by the terminal device is code-domain resource 3. If the first slice-related information indicates that the terminal device supports network slice n, the PRACH code-domain resource supported by the terminal device is code-domain resource 4.

Exemplarily, if the first slice-related information indicates that the terminal device supports a network slice, a preamble used by the terminal device is preamble 1. If the first slice-related information indicates that the terminal device does not support a network slice, the preamble used by the terminal device is preamble 2. If first slice-related information indicates that the terminal device supports network slice m, the preamble used by the terminal device is preamble 3. If the first slice-related information indicates that the terminal device supports network slice n, the preamble used by the terminal device is preamble 4.

Exemplarily, if the first slice-related information indicates that the terminal device supports a network slice, a preamble used by the terminal device is preamble 1. If the first slice-related information indicates that the terminal device does not support a network slice, the preamble used by the terminal device is preamble 2.

Exemplarily, if the first slice-related information indicates that the terminal device supports a network slice, the terminal device uses preamble 1 and RO 1. If the first slice-related information indicates that the terminal device does not support a network slice, the terminal device uses preamble 2 and RO 2. If the first slice-related information indicates that the terminal device supports network slice m, the terminal device uses preamble 3 and RO 3. If the first slice-related information indicates that the terminal device supports network slice n, the terminal device uses preamble 4 and RO 4.

Exemplarily, if the first slice-related information indicates that the terminal device supports a network slice, the terminal device uses preamble 1 and RO 1. If the first slice-related information indicates that the terminal device does not support a network slice, the terminal device uses preamble 2 and RO 2.

The following will exemplify the case where different first slice-related information corresponds to different sizes of the Msg 3 or different sizes of the Msg A in the random access procedure.

Exemplarily, if the first slice-related information indicates that the terminal device supports a network slice, the terminal device transmits the Msg 3 of a first length. If the first slice-related information indicates that the terminal device does not support a network slice, the terminal device transmits the Msg 3 of a second length. The first length may be 56 bits and the second length may be 48 bits, or the first length may be 48 bits and the second length may be 56 bits.

Exemplarily, if useFullResumeID is set to true, it indicates that an RRC resume procedure is initiated. If the first slice-related information indicates that the terminal device supports a network slice, the terminal device transmits RRC resume request 1. Otherwise, if the first slice-related information indicates that the terminal device does not support a network slice, the terminal device transmits RRC resume request. Or if useFulResumeID is set to true, it indicates that an RRC resume procedure is initiated. If the first slice-related information indicates that the terminal device does not support a network slice, the terminal device transmits RRC resume request 1. Otherwise, if the first slice-related information indicates that the terminal device supports a network slice, the terminal device transmits RRC resume request. RRC resume request 1 and RRC resume request are Msg 3 with different sizes.

It is to be noted that, in the disclosure, "support" may also be referred to as "require", "expect", "be interested in", "select", or "a network slice for a UE matches a network slice supported by a network side", etc. For example, "a network slice supported by the terminal device" may also be referred to as "a network slice required by the terminal device", "a network slice expected by the terminal device", "a network slice that the terminal device is interested in", or "a network slice selected by the terminal device".

Optionally, the network slice selected by the terminal device refers to a network slice selected by the terminal device from at least one network slice provided by a communication system.

Optionally, the network slice supported by the terminal device is a network slice with the highest priority selected by the terminal device, or the network slice supported by the terminal device is a network slice with the highest priority selected by the terminal device and supported by the network device.

Optionally, the network slice with the highest priority is a network slice with the highest priority for the terminal device.

Optionally, the terminal device can determine a network slice supported by the network device according to second slice-related information broadcast by the network device. The second slice-related information of the network device includes at least one of: an ID of at least one network slice, a priority of at least one network slice, a correspondence between at least one frequency and at least one network slice, a correspondence between at least one cell and at least one network slice, a frequency priority of at least one frequency corresponding to at least one network slice, a cell priority of at least one cell corresponding to at least one network slice, a correspondence between at least one random access resource and at least one network slice, a correspondence between at least one random-access parameter value and at least one network slice, or a correspondence between at least one random-access parameter value and at least one random access resource.

The following will elaborate information included in the second slice-related information.

Optionally, the ID of at least one network slice may be an ID of at least one network slice supported by the network device, may be an ID of at least one network slice not supported by the network device, may be an ID of a network slice supported by a neighbor cell of a serving cell of the network device, or may be IDs of all network slices of a network side.

Optionally, the priority of at least one network slice may be a priority of at least one network slice supported by the network device, may be a priority of at least one network slice not supported by the network device, may be a priority of a network slice supported by a neighbor cell of a serving cell of the network device, or may be priorities of all network slices of a network side.

Optionally, the correspondence between at least one frequency and at least one network slice may be a correspondence between at least one frequency and at least one network slice supported by the network device, may be a correspondence between at least one frequency and at least one network slice not supported by the network device, may be a correspondence between a frequency and a network slice supported by a neighbor cell of a serving cell of the network device, or may be a correspondence between at least one frequency and all network slices.

Optionally, the correspondence between at least one cell and at least one network slice may be a correspondence between at least one cell and at least one network slice supported by the network device, may be a correspondence between at least one cell and at least one network slice not supported by the network device, may be a correspondence between a cell and a network slice supported by a neighbor cell of a serving cell of the network device, or may be a correspondence between at least one cell and all network slices.

Optionally, the frequency priority of at least one frequency corresponding to at least one network slice may be a frequency priority of at least one frequency corresponding to a network slice supported by the network device, may be a frequency priority of at least one frequency corresponding to a network slice not supported by the network device, may be a frequency priority of at least one frequency corresponding to a network slice supported by a neighbor cell, or may be a frequency priority of at least one frequency corresponding to all network slices of a network side.

Optionally, the cell priority of at least one cell corresponding to at least one network slice may be a cell priority of at least one cell corresponding to a network slice supported by the network device, may be a cell priority of at least one cell corresponding to a network slice not supported by the network device, may be a cell priority of at least one cell corresponding to a network slice supported by a neighbor cell, or may be a cell priority of at least one cell corresponding to all network slices of a network side.

Optionally, the correspondence between at least one random access resource and at least one network slice may be a correspondence between a network slice supported by the network device and a random access resource, may be a correspondence between a network slice not supported by the network device and a random access resource, may be a correspondence between a network slice supported by a neighbor cell and a random access resource, or may be a correspondence between all network slices and a random access resource(s).

Optionally, the correspondence between at least one random-access parameter value and at least one network slice may be a correspondence between a network slice supported by the network device and a random-access parameter value, may be a correspondence between a network slice not supported by the network device and a random-access parameter value, may be a correspondence between a network slice supported by a neighbor cell and a random-access parameter value, or may be a correspondence between all network slices and a random-access parameter value(s).

Optionally, the correspondence between at least one random-access parameter value and at least one random access resource may be a correspondence between a random access resource corresponding to a network slice supported by the network device and a random-access parameter value corresponding to the network slice supported by the network device, may be a correspondence between a random access resource corresponding to a network slice not supported by the network device and a random-access parameter value corresponding to the network slice not supported by the network device, may be a correspondence between a random access resource corresponding to a network slice supported by a neighbor cell and a random-access parameter value corresponding to the network slice supported by a neighbor cell, or may be a correspondence between a random access resource(s) corresponding to all network slices and a random-access parameter value(s) corresponding to all the network slices.

Optionally, the ID of at least one network slice may be an ID of at least one network slice supported by the network device. In this case, the terminal device can determine a network slice supported by the network device. The ID of at least one network slice may also be an ID of at least one network slice not supported by the network device. In this case, once the terminal device has obtained IDs of all network slices, the terminal device can determine a network slice supported by the network device according to the ID of at least one network slice not supported by the network device. Or the ID of at least one network slice may be IDs of at least one network slice not supported and supported by the network device, for example, IDs of all network slices of a network side. Optionally, in this case, the terminal device needs an extra indication from the network device, to determine a network slice supported by the network device. In addition, a network slice ID may also be a slice group ID, a slice type ID, etc.

Optionally, the priority of at least one network slice may be a priority of at least one network slice supported by the network device. In this case, the terminal device can determine the priority of at least one network slice supported by the network device. The priority of at least one network slice may also be a priority of at least one network slice not supported by the network device. In this case, once the terminal device has obtained priorities of all network slices, the terminal device can determine a priority of a network slice supported by the network device according to the priority of at least one network slice not supported by the network device. Or the priority of at least one network slice may be priorities of at least one network slice not supported and supported by the network device, for example, priorities of all network slices of a network side. Optionally, in this case, the terminal device needs an extra indication from the network device, to determine a priority of a network slice supported by the network device.

Optionally, the correspondence between at least one frequency and at least one network slice is a correspondence between at least one frequency and at least one network slice supported by the network device. Once the terminal device has obtained the correspondence, the terminal device can determine a correspondence between a frequency and a network slice supported by the network device. Or the correspondence between at least one frequency and at least one network slice is a correspondence between at least one frequency and at least one network slice not supported by the network device. In this case, once the terminal device has obtained a correspondence between all network slices and a frequency(ies), the terminal device can determine a correspondence between at least one frequency and at least one network slice supported by the network device according to the correspondence between at least one frequency and at least one network slice not supported by the network device. Or the correspondence between at least one frequency and at least one network slice is a correspondence between at least one frequency and all network slices. Optionally, in this case, the terminal device needs an extra indication from the network device, to determine a correspondence between at least one frequency and a network slice(s) supported by the network device.

Optionally, the correspondence between at least one cell and at least one network slice is a correspondence between at least one cell and at least one network slice supported by the network device. Once the terminal device has obtained the correspondence, the terminal device can determine a correspondence between a cell and a network slice supported by the network device. Or the correspondence between at least one cell and at least one network slice is a correspondence between at least one cell and at least one network slice not supported by the network device. In this case, once the terminal device has obtained a correspondence between at least one cell and all network slices, the terminal device can determine a correspondence between at least one cell and at least one network slice supported by the network device according to the correspondence between at least one cell and at least one network slice not supported by the network device. Or the correspondence between at least one cell and at least one network slice is a correspondence between at least one cell and all network slices. Optionally, in this case, the terminal device needs an extra indication from the network device, to determine a correspondence between a cell and a network slice supported by the network device.

Optionally, the frequency priority of at least one frequency corresponding to at least one network slice is a frequency priority of at least one frequency corresponding to a network slice supported by the network device. Exemplarily, frequency priorities of at least one frequency corresponding to different network slices may be the same or different. In this case, once the terminal device has obtained the priority, the terminal device can determine different frequency priorities corresponding to all network slices supported by the network device. Or the frequency priority of at least one frequency corresponding to at least one network slice is a frequency priority of at least one frequency corresponding to a network slice not supported by the network device. Exemplarily, frequency priorities of at least one frequency corresponding to different network slices may be the same or different. In this case, once the terminal device has obtained frequency priorities of a frequency(ies) corresponding to all network slices, the terminal device can determine a frequency priority of at least one frequency corresponding to a network slice supported by the network device according to the frequency priority of at least one frequency corresponding to a network slice not supported by the network device. Or the frequency priority of at least one frequency corresponding to at least one network slice is frequency priorities of at least one frequency corresponding to all network slices of a network side. Exemplarily, frequency priorities of at least one frequency corresponding to different network slices may be the same or different. Optionally, in this case, the terminal device needs an extra indication from the network device, to determine a frequency priority of at least one frequency corresponding to a network slice supported by the network device.

Optionally, the cell priority of at least one cell corresponding to at least one network slice is a cell priority of at least one cell corresponding to a network slice supported by the network device. Or the cell priority of at least one cell corresponding to at least one network slice is a cell priority of at least one cell corresponding to a network slice not supported by the network device. In this case, once the terminal device has obtained cell priorities of cells corresponding to all network slices, the terminal device can determine a cell priority of at least one cell corresponding to a network slice supported by the network device according to the cell priority of at least one cell corresponding to a network slice not supported by the network device. Or the cell priority of at least one cell corresponding to at least one network slice is cell priorities of at least one cell corresponding to all network slice of a network side. Optionally, in this case, the terminal device needs an extra indication from the network device, to determine a cell priority of at least one cell corresponding to a network slice supported by the network device.

Optionally, the correspondence between at least one random access resource and at least one network slice is a correspondence between a network slice supported by the network device and a random access resource. Or the correspondence between at least one random access resource and at least one network slice is a correspondence between a network slice not supported by the network device and a random access resource. In this case, once the terminal device has obtained a correspondence between all network slices and a random access resource(s), the terminal device can determine a correspondence between a network slice supported by the network device and a random access resource according to the correspondence between a network slice not supported by the network device and a random access resource. Or the correspondence between at least one random access resource and at least one network slice is a correspondence between all network slices and a random access resource(s). Optionally, in this case, the terminal device needs an extra indication from the network device, to determine a correspondence between a network slice supported by the network device and a random access resource.

Optionally, the correspondence between at least one random-access parameter value and at least one network slice is a correspondence between a network slice supported by the network device and a random-access parameter value. Or the correspondence between at least one random-access parameter value and at least one network slice is a correspondence between a network slice not supported by the network device and a random-access parameter value. In this case, once the terminal device has obtained a correspondence between all network slices and a random-access parameter value(s), the terminal device can determine a correspondence between a network slice supported by the network device and a random-access parameter value according to the correspondence between a network slice not supported by the network device and a random-access parameter value. Or the correspondence between at least one random-access parameter value and at least one network slice is a correspondence between all network slices and a random-access parameter value(s). Optionally, in this case, the terminal device needs an extra indication from the network device, to determine a correspondence between a network slice supported by the network device and a random-access parameter value.

Optionally, the correspondence between at least one random-access parameter value and at least one random access resource is a correspondence between a random access resource corresponding to a network slice supported by the network device and a random-access parameter value corresponding to the network slice supported by the network device. Or the correspondence between at least one random-access parameter value and at least one random access resource is a correspondence between a random access resource corresponding to a network slice not supported by the network device and a random-access parameter value corresponding to the network slice not supported by the network device. In this case, once the terminal device has obtained a correspondence between a random access resource(s) corresponding to all network slices and a random-access parameter value(s) corresponding to all the network slices, the terminal device can determine a correspondence between a random access resource corresponding to a network slice supported by the network device and a random-access parameter value corresponding to the network slice supported by the network device according to the correspondence between a random access resource corresponding to a network slice not supported by the network device and a random-access parameter value corresponding to the network slice not supported by the network device. Or the correspondence between at least one random-access parameter value and at least one random access resource is a correspondence between a random access resource(s) corresponding to all network slices and a random-access parameter value(s) corresponding to all the network slices. Optionally, in this case, the terminal device needs an extra indication from the network device, to determine a correspondence between a random access resource corresponding to a network slice supported by the network device and a random-access parameter value corresponding to the network slice supported by the network device.

Optionally, the "correspondence" in the disclosure may be a one-to-one correspondence, a multiple-to-one correspondence, a one-to-multiple correspondence, or a multiple-to-multiple correspondence.

Optionally, the ID of a network slice is any one of: NSSAI, single network slice selection assistance information (S-NSSAI), and a network slicing identity (NSID).

Optionally, the random-access parameter value includes a backoff parameter value and/or a power modification value. The power modification value may be a power-ramping value or a power-slipping value.

Optionally, the backoff parameter value and/or the power-ramping parameter value may be an absolute value, or may be a relative value or an adjustment value.

Optionally, the backoff parameter value indicates a wait time or interval length for next Msg 1 or Msg A, that is, the backoff parameter value indicates backoff. Or the backoff parameter value indicates an adjustment value/adjustment factor for a wait time or interval length for next Msg 1 or Msg A transmission, that is, the backoff parameter value is a backoff factor.

The power-ramping parameter indicates an increase value or increased value of power required when initiates random access next time, that is, the power-ramping parameter indicates power ramping. Or the power-ramping parameter indicates an adjustment value/adjustment factor for the increase value or increased value of power required when initiates random access next time, that is, the power-ramping parameter is a power-ramping factor.

As can be seen, in the disclosure, the terminal device transmits to the network device information of whether the terminal device supports a network slice and/or a network slice supported by the terminal device in the random access procedure. In other words, the network device can know a network slice required by the terminal device in the random access procedure, without waiting for reception of Msg 5. With the technical solutions provided in the disclosure, it is possible to reduce service delay of the terminal device.

After the above step S301, the terminal device can perform subsequent operations, such as random access, cell selection or reselection, etc., which will be elaborated below in connection with the following implementations.

Implementation 1: the terminal device receives access-control information transmitted by the network device. Optionally, the terminal device determines a random-access result according to the access-control information, performs random access according to the access-control information, determines information for cell selection or cell reselection according to the access-control information, performs cell selection or cell reselection according to the access-control information, and/or determines an RRC state according to the access-control information.

Implementation 2: the terminal device performs random access according to the first slice-related information.

Implementation 3: the terminal device receives a random-access parameter value transmitted by the network device. The terminal device performs random access according to the random-access parameter value.

The following will describe implementation 1 in detail.

Optionally, the access-control information is transmitted by the network device when a first condition is satisfied.

Optionally, the first condition includes at least one of: the terminal device does not support a network slice, a network slice supported by the terminal device is not a network slice supported by the network device, a network slice supported by the terminal device is not a network slice which satisfies a priority condition and is supported by the network device, the number of times of request for a network slice supported by the terminal device reaches a preset threshold, a network slice supported by the terminal device is not a network slice required by the network device for prioritized access, or a network slice supported by the terminal device is not an intended network slice.

Optionally, in the disclosure, "the terminal device does not support a network slice" means that the terminal device does not support any network slice, or a network slice supported by the terminal device does not match at least one of network slices supported by a network side.

Optionally, in the disclosure, the preset threshold may be set according to actual needs. For example, the preset threshold may be set to 50 or 100, etc.

Optionally, the access-control information is carried in an RRC reject message.

Optionally, the RRC Reject further contains cause for the network device to reject random access of the terminal device. The cause may be at least one of: the terminal device does not support a network slice, a network slice supported by the terminal device is not a network slice supported by the network device, a network slice supported by the terminal device is not a network slice which satisfies a priority condition and is supported by the network device, the number of times of request for a network slice supported by the terminal device reaches a preset threshold, a network slice supported by the terminal device is not a network slice required by the network device for prioritized access, or a network slice supported by the terminal device is not an intended network slice.

Optionally, the access-control information includes at least one of: a network slice supported by a serving cell of the network device, a network slice supported by a neighbor cell of the serving cell, an ID of at least one network slice, a priority of at least one network slice, a correspondence between at least one frequency and at least one network slice, a correspondence between at least one cell and at least one network slice, a frequency priority of at least one frequency corresponding to at least one network slice, a cell priority of at least one cell corresponding to at least one network slice, a correspondence between at least one random access resource and at least one network slice, a correspondence between at least one random-access parameter value and at least one network slice, or a correspondence between at least one random-access parameter value and at least one random access resource.

The following will elaborate information included in the access-control information.

Optionally, the ID of at least one network slice may be an ID of at least one network slice supported by the network device, may be an ID of at least one network slice not supported by the network device, may be an ID of a network slice supported by the neighbor cell of the serving cell of the network device, or may be IDs of all network slices of a network side.

Optionally, the priority of at least one network slice may be a priority of at least one network slice supported by the network device, may be a priority of at least one network slice not supported by the network device, may be a priority of a network slice supported by the neighbor cell of the serving cell of the network device, or may be priorities of all network slices of a network side.

Optionally, the correspondence between at least one frequency and at least one network slice may be a correspondence between at least one frequency and at least one network slice supported by the network device, may be a correspondence between at least one frequency and at least one network slice not supported by the network device, may be a correspondence between a frequency and a network slice supported by the neighbor cell of the serving cell of the network device, or may be a correspondence between at least one frequency and all network slices.

Optionally, the correspondence between at least one cell and at least one network slice may be a correspondence between at least one cell and at least one network slice supported by the network device, may be a correspondence between at least one cell and at least one network slice not supported by the network device, may be a correspondence between a cell and a network slice supported by a neighbor cell of the serving cell of the network device, or may be a correspondence between at least one cell and all network slices.

Optionally, the frequency priority of at least one frequency corresponding to at least one network slice may be a frequency priority of at least one frequency corresponding to a network slice supported by the network device, may be a frequency priority of at least one frequency corresponding to a network slice not supported by the network device, may be a frequency priority of at least one frequency corresponding to a network slice supported by the neighbor cell, or may be a frequency priority of at least one frequency corresponding to all network slices of a network side.

Optionally, the cell priority of at least one cell corresponding to at least one network slice may be a cell priority of at least one cell corresponding to a network slice supported by the network device, may be a cell priority of at least one cell corresponding to a network slice not supported by the network device, may be a cell priority of at least one cell corresponding to a network slice supported by the neighbor cell, or may be a cell priority of at least one cell corresponding to all network slices of a network side.

Optionally, the correspondence between at least one random access resource and at least one network slice may be a correspondence between a network slice supported by the network device and a random access resource, may be a correspondence between a network slice not supported by the network device and a random access resource, may be a correspondence between a network slice supported by the neighbor cell and a random access resource, or may be a correspondence between all network slices and a random access resource(s).

Optionally, the correspondence between at least one random-access parameter value and at least one network slice may be a correspondence between a network slice supported by the network device and a random-access parameter value, may be a correspondence between a network slice not supported by the network device and a random-access parameter value, may be a correspondence between a network slice supported by the neighbor cell and a random-access parameter value, or may be a correspondence between all network slices and a random-access parameter value(s).

Optionally, the correspondence between at least one random-access parameter value and at least one random access resource may be a correspondence between a random access resource corresponding to a network slice supported by the network device and a random-access parameter value corresponding to the network slice supported by the network device, may be a correspondence between a random access resource corresponding to a network slice not supported by the network device and a random-access parameter value corresponding to the network slice not supported by the network device, may be a correspondence between a random access resource corresponding to a network slice supported by the neighbor cell and a random-access parameter value corresponding to the network slice supported by the neighbor cell, or may be a correspondence between a random access resource(s) corresponding to all network slices and a random-access parameter value(s) corresponding to all the network slices.

Optionally, the random-access result determined by the terminal device according to the access-control information is an RRC reject.

Optionally, the following will exemplarily elaborate performing random access according to the access-control information by the terminal device.

Example 1: the terminal device obtains a network slice supported by the network device according to the access-control information. If the terminal device also supports the network slice, the terminal device carries information related to the network slice in the random access procedure to re-perform the random access procedure, for example, to retransmit the Msg 3 or the Msg A.

Example 2: the terminal device obtains a network slice supported by the neighbor cell according to the access-control information. If the terminal device also supports the network slice, in the neighbor cell, the terminal device carries information related to the network slice in the random access procedure to re-perform the random access procedure, for example, to retransmit the Msg 3 or the Msg A.

Example 3: the terminal device obtains the ID of at least one network slice. The terminal device selects one network slice, and carries information related to the network slice in the random access procedure to re-perform the random access procedure.

Example 4: the terminal device obtains the priority of at least one network slice. The terminal device selects a network slice having the highest priority, and carries information related to the network slice in the random access procedure to re-perform the random access procedure.

Example 5: the terminal device obtains the correspondence between at least one frequency and at least one network slice. The terminal device selects one network slice supported by the terminal device according to the correspondence, and performs measurement regarding cell selection or reselection at the frequency or makes determination regarding cell selection or reselection at the frequency, or in a cell corresponding to the frequency, the terminal device carries information related to the network slice in the random access procedure to re-perform the random access procedure.

Example 6: the terminal device obtains the correspondence between at least one cell and at least one network slice. The terminal device selects one network slice supported by the terminal device according to the correspondence, and performs measurement regarding cell selection or reselection in a cell corresponding to the network slice or makes determination regarding cell selection or reselection at the frequency, or in the cell, the terminal device carries information related to the network slice in the random access procedure to re-perform the random access procedure.

Example 7: the terminal device obtains the frequency priority of at least one frequency corresponding to at least one network slice. The terminal device selects a frequency having the highest priority. If a network slice corresponding to the frequency having the highest priority is supported by the terminal device, in a cell corresponding to the frequency, the terminal device carries information related to the network slice in the random access procedure to re-perform the random access procedure.

Example 8: the terminal device obtains the cell priority of at least one cell corresponding to at least one network slice. The terminal device selects a cell having the highest priority. If a network slice corresponding to the cell having the highest priority is supported by the terminal device, in the cell, the terminal device carries information related to the network slice in the random access procedure to re-perform the random access procedure.

Example 9: the terminal device obtains the frequency priority of at least one frequency corresponding to at least one network slice. The terminal device selects a slice, and according to at least one frequency and/or a frequency priority of the at least one frequency corresponding to the slice, the terminal device performs measurement regarding cell selection or reselection, or makes determination regarding cell selection or reselection at the frequency, or carries information related to the network slice in the random access procedure to re-perform the random access procedure.

Example 10: the terminal device obtains the frequency priority of at least one frequency corresponding to at least one network slice. The terminal device selects a slice having the highest priority (for example, a slice that the terminal device considers as having the highest priority, or a slice that is indicated by a network to have the highest priority), and according to at least one frequency and/or a frequency priority of the at least one frequency corresponding to the slice, the terminal device performs measurement regarding cell selection or reselection, or makes determination regarding cell selection or reselection at the frequency, or carries information related to the network slice in the random access procedure to re-perform the random access procedure.

Example 11: the terminal device obtains the cell priority of at least one cell corresponding to at least one network slice. The terminal device selects a slice, and according to at least one cell and/or a cell priority of the at least one cell corresponding to the slice, the terminal device performs measurement regarding cell selection or reselection, or makes determination regarding cell selection or reselection at the frequency, or carries information related to the network slice in the random access procedure to re-perform the random access procedure.

Example 12: the terminal device obtains the cell priority of at least one cell corresponding to at least one network slice. The terminal device selects a slice having the highest priority (for example, a slice that the terminal device considers as having the highest priority, or a slice that is indicated by a network to have the highest priority), and according to at least one cell and/or a cell priority of the at least one cell corresponding to the slice, the terminal device performs measurement regarding cell selection or reselection, or makes determination regarding cell selection or reselection at the frequency, or carries information related to the network slice in the random access procedure to re-perform the random access procedure.

Example 13: the terminal device obtains the correspondence between at least one random access resource and at least one network slice. The terminal device selects a network slice supported by the terminal device according to the correspondence, and in a cell corresponding to the random access resource, the terminal device carries information related to the network slice in the random access procedure to re-perform the random access procedure.

Example 14: the terminal device obtains the correspondence between at least one random access resource and at least one network slice. The terminal device can determine a corresponding random access resource according to a network slice (which can be determined before) and the correspondence between slices and random access resources, and use the random access resource to initiate the random access procedure, such that information related to the network slice is implicitly carried and transmitted to a network.

Example 15: the terminal device obtains the correspondence between at least one random-access parameter value and at least one network slice. The terminal device selects a network slice supported by the terminal device according to the correspondence, and in a cell corresponding to the random-access parameter value, the terminal device carries information related to the network slice in the random access procedure to re-perform the random access procedure.

Example 16: the terminal device obtains the correspondence between at least one random-access parameter value and at least one network slice. According to a network slice (which can be determined before) and the correspondence between slices and random-access parameter values, the terminal device uses the random-access parameter value to perform the random access procedure.

Example 17: the terminal device obtains the correspondence between at least one random-access parameter value and at least one random access resource. The terminal device selects a random access resource according to the correspondence. Once determining that a network slice corresponding to the random access resource is supported by the terminal device, in a cell corresponding to the random access resource, the terminal device carries information related to the network slice in the random access procedure to re-perform the random access procedure.

Example 18: the terminal device obtains the correspondence between at least one random-access parameter value and at least one random access resource. According to a random access resource (which can be determined before) and the correspondence between random access resources and random-access parameter values, the terminal device uses the random-access parameter value to perform the random access procedure.

It is to be noted that, examples of determining the information for cell selection or cell reselection according to the access-control information by the terminal device are similar to those of performing random access according to the access-control information by the terminal device, and will not be described in detail in the disclosure.

Optionally, the RRC state determined by the terminal device according to the access-control information may be an RRC idle state.

The following will describe implementation 2 in detail.

Optionally, the terminal device performs random access according to a random-access parameter value corresponding to the first slice-related information.

Optionally, if multiple groups of random-access parameter values are received by the terminal device, the terminal device selects one group of random-access parameter values from the multiple groups of random-access parameter values (for example, selects according to slice information), to perform random access according to the group of random-access parameter values. The parameter values may be broadcast/carried in dedicated signaling (such as RRC release)/preconfigured.

Optionally, different first slice-related information corresponds to different random-access parameter values. For example, if the first slice-related information indicates that the terminal device supports a network slice, a corresponding random-access parameter value is random-access parameter value 0. If the first slice-related information indicates that the terminal device does not support a network slice, the corresponding random-access parameter value is random-access parameter value 1. If the first slice-related information indicates that the terminal device supports network slice m, the corresponding random-access parameter value is random-access parameter value 2. If the first slice-related information indicates that the terminal device supports network slice n, the corresponding random-access parameter value is random-access parameter value 3.

Optionally, if a first condition or a second condition is satisfied, the terminal device performs random access according to the first slice-related information.

The first condition has been described above and will not be elaborated again herein.

Optionally, the second condition includes at least one of: the terminal device supports a network slice, a network slice supported by the terminal device is a network slice supported by the network device, a network slice supported by the terminal device is a network slice which satisfies a priority condition and is supported by the network device, the number of times of request for a network slice supported by the terminal device does not reach a preset threshold, a network slice supported by the terminal device is a network slice required by the network device for prioritized access, or a network slice supported by the terminal device is an intended network slice.

The following will describe implementation 3 in detail.

Optionally, the random-access parameter value received by the terminal device from the network device is determined by the network device according to the first slice-related information. In other words, the first slice-related information and the random-access parameter value are in a correspondence.

Optionally, if multiple groups of random-access parameter values are received by the terminal device, the terminal device selects one group of random-access parameter values from the multiple groups of random-access parameter values (for example, selects according to slice information), to perform random access according to the group of random-access parameter values. The parameter values may be broadcast/dedicated signaling (such as RRC release)/pre-configured.

Optionally, different first slice-related information corresponds to different random-access parameter values. For example, if the first slice-related information indicates that the terminal device supports a network slice, a corresponding random-access parameter value is random-access parameter value 0. If the first slice-related information indicates that the terminal device does not support a network slice, the corresponding random-access parameter value is random-access parameter value 1. If the first slice-related information indicates that the terminal device supports network slice m, the corresponding random-access parameter value is random-access parameter value 2. If the first slice-related information indicates that the terminal device supports network slice n, the corresponding random-access parameter value is random-access parameter value 3.

Optionally, the terminal device receives indication information transmitted by the network device. The indication information indicates the random-access parameter value or indicates the random-access parameter value selected.

Optionally, if one group of random-access parameter values is received by the terminal device, the indication information indicates the group of random-access parameter values. The terminal device can perform random access directly according to the group of random-access parameter values.

Optionally, if at least one group of random-access parameter values is received by the terminal device, the indication information indicates to select random-access parameter values according to slice information. The terminal device can determine the random-access parameter values according to the slice information, and perform random access according to the group of random-access parameter values.

Optionally, if multiple groups of random-access parameter values are received by the terminal device, the indication information indicates that the terminal device selects one group of random-access parameter values from the multiple groups of random-access parameter values (for example, selects according to slice information), and as such, the terminal device performs random access according to the group of random-access parameter values. The parameter values may be broadcast/dedicated signaling (such as RRC release)/preconfigured. In addition, a network can further indicate which group of random-access parameter values is to be used by the terminal device.

Optionally, if at least one group of random-access parameter values is received by the terminal device, the indication information indicates which group of random-access parameter values is to be used by the terminal device for random access.

Optionally, if the terminal device has received at least one group of random-access parameter values, and has also received at least one group of random-access parameter values broadcast by the network device, the indication information indicates to use random-access parameter values transmitted in non-broadcast manner. The terminal device can perform random access according to the group of random-access parameter values. Optionally, if the terminal device has received at least one group of random-access parameter values, and has also received at least one group of random-access parameter values broadcast by the network device, the terminal device determines, according to slice information, which group of random-access parameter values to be used for random access.

Optionally, the indication information is a value of a reserved bit in the random access procedure. For example, different values of a reserved bit in an RAR can be used for indicating that the terminal device does not use the random-access parameter value(s) or indicating the random-access parameter value(s) to be used.

Optionally, the random-access parameter value is transmitted by the network device when a first condition or a second condition is satisfied.

The first condition and the second condition have been described above and will not be elaborated again herein.

As can be seen, in the disclosure, with implementation 1 above, the network device can perform access control on the terminal device, such as transmitting an RRC reject to the terminal device, which is possible to ensure that a terminal device supporting the same network slice as the network device can have priority to access a network. With implementation 2 above, different terminal devices can use different random-access parameter values, which is possible to ensure that terminal devices having different requirements, such as delay requirements, can access to a network. With implementation 2 above, the network device can perform access control on the terminal device, such that different terminal devices can use different random-access parameter values, thereby ensuring that terminal devices having different requirements, such as delay requirements, can access to a network.

With the technical solutions described in the first aspect or in the second aspect, the network device can know a network slice required by the terminal device in the random access procedure, without waiting for reception of message (Msg) 5. With the technical solutions provided in the disclosure, it is possible to reduce service delay of the terminal device.

Method implementations of the disclosure have been described in detail above with reference to FIG. 3. The following will elaborate apparatus implementations of the disclosure with reference to FIG. 4 to FIG. 8. It should be understood that, apparatus implementations and method implementations correspond to each other. For similar illustrations, reference can be made to method implementations.

Figure 4:
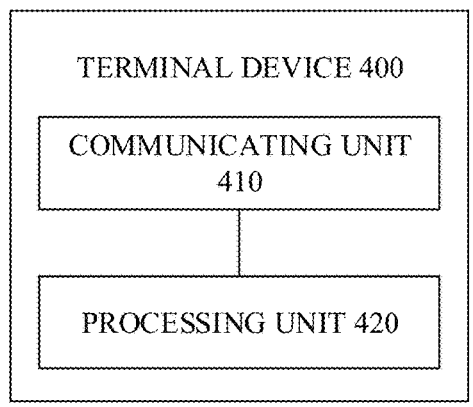
FIG. 4 is a schematic block diagram of a terminal device 400 according to implementations of the disclosure.

FIG. 4 is a schematic block diagram of a terminal device 400 according to implementations of the disclosure. As illustrated in FIG. 4, the terminal device 400 includes a communicating unit 410. The communicating unit 410 is configured to transmit first slice-related information to a network device, where the first slice-related information is carried in a random access procedure, and the first slice-related information indicates whether the terminal device supports a network slice and/or indicates a network slice supported by the terminal device.

Optionally, different first slice-related information corresponds to different random access resources, the first slice-related information is carried in Msg 3 or Msg A in the random access procedure, or different first slice-related information corresponds to different sizes of the Msg 3 or different sizes of the Msg A in the random access procedure.

Optionally, the first slice-related information is a CCCH ID in the Msg 3 or the Msg A, or the first slice-related information is extra indication information in the Msg 3 or the Msg A.

Optionally, the CCCH ID is related to the first slice-related information.

Optionally, the CCCH ID is a CCCH LCID.

Optionally, the communicating unit 410 is further configured to receive access-control information transmitted by the network device.

Optionally, the terminal device 400 further includes a processing unit 420. The processing unit 420 is configured to perform at least one of: determining a random-access result according to the access-control information, performing random access according to the access-control information, determining information for cell selection or cell reselection according to the access-control information, performing cell selection or cell reselection according to the access-control information, or determining an RRC state according to the access-control information.

Optionally, the access-control information includes at least one of: a network slice supported by a serving cell of the network device, a network slice supported by a neighbor cell of the serving cell, an ID of at least one network slice, a priority of at least one network slice, a correspondence between at least one frequency and at least one network slice, a correspondence between at least one cell and at least one network slice, a frequency priority of at least one frequency corresponding to at least one network slice, a cell priority of at least one cell corresponding to at least one network slice, a correspondence between at least one random access resource and at least one network slice, a correspondence between at least one random-access parameter value and at least one network slice, or a correspondence between at least one random-access parameter value and at least one random access resource.

Optionally, the access-control information is transmitted by the network device when a first condition is satisfied.

Optionally, the access-control information is carried in an RRC reject message.

Optionally, the RRC reject message further contains cause for the network device to reject random access of the terminal device.

Optionally, the terminal device 400 further includes a processing unit 420. The processing unit 420 is configured to perform random access according to the first slice-related information.

Optionally, the processing unit 420 is specifically configured to perform random access according to a random-access parameter value corresponding to the first slice-related information.

Optionally, the processing unit 420 is specifically configured to perform random access according to the first slice-related information when a first condition or a second condition is satisfied.

Optionally, further includes a processing unit 420. The communicating unit 410 is further configured to receive a random-access parameter value transmitted by the network device. The processing unit 420 is configured to perform random access according to the random-access parameter value.

Optionally, the communicating unit 410 is further configured to receive indication information transmitted by the network device, where the indication information indicates the random-access parameter value or indicates the random-access parameter value selected.

Optionally, the indication information is a value of a reserved bit in the random access procedure.

Optionally, the random-access parameter value is transmitted by the network device when a first condition or a second condition is satisfied.

Optionally, the first condition includes at least one of: the terminal device does not support a network slice, a network slice supported by the terminal device is not a network slice supported by the network device, a network slice supported by the terminal device is not a network slice which satisfies a priority condition and is supported by the network device, the number of times of request for a network slice supported by the terminal device reaches a preset threshold, a network slice supported by the terminal device is not a network slice required by the network device for prioritized access, or a network slice supported by the terminal device is not an intended network slice.

Optionally, the second condition includes at least one of: the terminal device supports a network slice, a network slice supported by the terminal device is a network slice supported by the network device, a network slice supported by the terminal device is a network slice which satisfies a priority condition and is supported by the network device, the number of times of request for a network slice supported by the terminal device does not reach a preset threshold, a network slice supported by the terminal device is a network slice required by the network device for prioritized access, or a network slice supported by the terminal device is an intended network slice.

Optionally, the communicating unit 410 is further configured to receive second slice-related information broadcast by the network device. The second slice-related information includes at least one of: an ID of at least one network slice, a priority of at least one network slice, a correspondence between at least one frequency and at least one network slice, a correspondence between at least one cell and at least one network slice, a frequency priority of at least one frequency corresponding to at least one network slice, a cell priority of at least one cell corresponding to at least one network slice, a correspondence between at least one random access resource and at least one network slice, a correspondence between at least one random-access parameter value and at least one network slice, or a correspondence between at least one random-access parameter value and at least one random access resource.

Optionally, the random-access parameter value includes a backoff parameter value and/or a power-ramping parameter value.

Optionally, the backoff parameter value and/or the power-ramping parameter value is an absolute value, a relative value, or an adjustment value.

Optionally, the backoff parameter value indicates a wait time or interval length for next Msg 1 or Msg A, or indicates an adjustment value/adjustment factor for a wait time or interval length for next Msg 1 or Msg A transmission. The power-ramping parameter indicates an increase value or increased value of power required when initiates random access next time, or indicates an adjustment value/adjustment factor for the increase value or increased value of power required when initiates random access next time.

Optionally, the random access resource includes at least one of a random access preamble, or a time-domain resource, a frequency-domain resource, or a code-domain resource for a PRACH.

Optionally, a network slice supported by the terminal device is a network slice with the highest priority selected by the terminal device, or a network slice supported by the terminal device is a network slice with the highest priority selected by the terminal device and supported by the network device.

Optionally, in some implementations, the communicating unit above may be a communication interface or a transceiver, or may be an input-output interface of a communication chip or system-on-chip (SOC). The processing unit above may be one or more processors.

It should be understood that, the terminal device 400 according to implementations of the disclosure may correspond to the terminal device in the method implementations of the disclosure, and the above and other operations and/or functions of various units of the terminal device 400 are respectively intended for implementing corresponding operations of the terminal device in the foregoing method implementations, which will not be repeated herein for the sake of simplicity.

Figure 5:
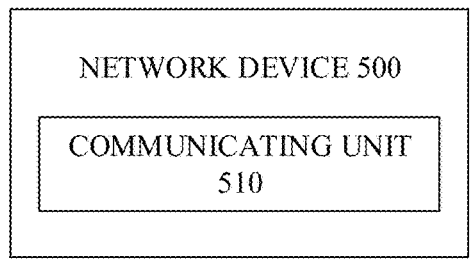
FIG. 5 is a schematic block diagram of a network device 500 according to implementations of the disclosure.

FIG. 5 is a schematic block diagram of a network device 500 according to implementations of the disclosure. As illustrated in FIG. 5, the network device 500 includes a communicating unit 510. The communicating unit 510 is configured to receive first slice-related information transmitted by a terminal device, where the first slice-related information is carried in a random access procedure, and the first slice-related information indicates whether the terminal device supports a network slice and/or indicates a network slice supported by the terminal device.

Optionally, different first slice-related information corresponds to different random access resources, the first slice-related information is carried in Msg 3 or Msg A in the random access procedure, or different first slice-related information corresponds to different sizes of the Msg 3 or different sizes of the Msg A in the random access procedure.

Optionally, the first slice-related information is a CCCH ID in the Msg 3 or the Msg A, or the first slice-related information is extra indication information in the Msg 3 or the Msg A.

Optionally, the CCCH ID is related to the first slice-related information.

Optionally, the CCCH ID is a CCCH LCID.

Optionally, the communicating unit 510 is further configured to transmit access-control information to the terminal device.

Optionally, further includes at least one of: the access-control information is used for determining a random-access result, the access-control information is used for the terminal device to perform random access, the access-control information is used for determining information for cell selection or cell reselection, the access-control information is used for the terminal device to perform cell selection or cell reselection, or the access-control information is used for determining an RRC state.

Optionally, the access-control information includes at least one of: a network slice supported by a serving cell of the network device, a network slice supported by a neighbor cell of the serving cell, an ID of at least one network slice, a priority of at least one network slice, a correspondence between at least one frequency and at least one network slice, a correspondence between at least one cell and at least one network slice, a frequency priority of at least one frequency corresponding to at least one network slice, a cell priority of at least one cell corresponding to at least one network slice, a correspondence between at least one random access resource and at least one network slice, a correspondence between at least one random-access parameter value and at least one network slice, or a correspondence between at least one random-access parameter value and at least one random access resource.

Optionally, the access-control information is transmitted by the network device when a first condition is satisfied.

Optionally, the access-control information is carried in an RRC reject message.

Optionally, the RRC reject message further contains cause for the network device to reject random access of the terminal device.

Optionally, the communicating unit 510 is further configured to transmit a random-access parameter value to the terminal device.

Optionally, the communicating unit 510 is further configured to transmit indication information to the terminal device, where the indication information indicates the random-access parameter value or indicates the random-access parameter value selected.

Optionally, the indication information is a value of a reserved bit in the random access procedure.

Optionally, the random-access parameter value is transmitted by the network device when a first condition or a second condition is satisfied.

Optionally, the first condition includes at least one of: the terminal device does not support a network slice, a network slice supported by the terminal device is not a network slice supported by the network device, a network slice supported by the terminal device is not a network slice which satisfies a priority condition and is supported by the network device, the number of times of request for a network slice supported by the terminal device reaches a preset threshold, a network slice supported by the terminal device is not a network slice required by the network device for prioritized access, or a network slice supported by the terminal device is not an intended network slice.

Optionally, the second condition includes at least one of: the terminal device supports a network slice, a network slice supported by the terminal device is a network slice supported by the network device, a network slice supported by the terminal device is a network slice which satisfies a priority condition and is supported by the network device, the number of times of request for a network slice supported by the terminal device does not reach a preset threshold, a network slice supported by the terminal device is a network slice required by the network device for prioritized access, or a network slice supported by the terminal device is an intended network slice.

Optionally, the communicating unit 510 is further configured to broadcast second slice-related information. The second slice-related information includes at least one of: an ID of at least one network slice, a priority of at least one network slice, a correspondence between at least one frequency and at least one network slice, a correspondence between at least one cell and at least one network slice, a frequency priority of at least one frequency corresponding to at least one network slice, a cell priority of at least one cell corresponding to at least one network slice, a correspondence between at least one random access resource and at least one network slice, a correspondence between at least one random-access parameter value and at least one network slice, or a correspondence between at least one random-access parameter value and at least one random access resource.

Optionally, the random-access parameter value includes a backoff parameter value and/or a power-ramping parameter value.

Optionally, the backoff parameter value and/or the power-ramping parameter value is an absolute value, a relative value, or an adjustment value.

Optionally, the backoff parameter value indicates a wait time or interval length for next Msg 1 or Msg A, or indicates an adjustment value/adjustment factor for a wait time or interval length for next Msg 1 or Msg A transmission. The power-ramping parameter indicates an increase value or increased value of power required when initiates random access next time, or indicates an adjustment value/adjustment factor for the increase value or increased value of power required when initiates random access next time.

Optionally, the random access resource includes at least one of a random access preamble, or a time-domain resource, a frequency-domain resource, or a code-domain resource for a PRACH.

Optionally, a network slice supported by the terminal device is a network slice with the highest priority selected by the terminal device, or a network slice supported by the terminal device is a network slice with the highest priority selected by the terminal device and supported by the network device.

Optionally, in some implementations, the communicating unit above may be a communication interface or a transceiver, or may be an input-output interface of a communication chip or SOC. The processing unit above may be one or more processors.

It should be understood that, the network device 500 according to implementations of the disclosure may correspond to the network device in the method implementations of the disclosure, and the above and other operations and/or functions of various units of the network device 500 are respectively intended for implementing corresponding operations of the network device in the foregoing method implementations, which will not be repeated herein for the sake of simplicity.

Figure 6:
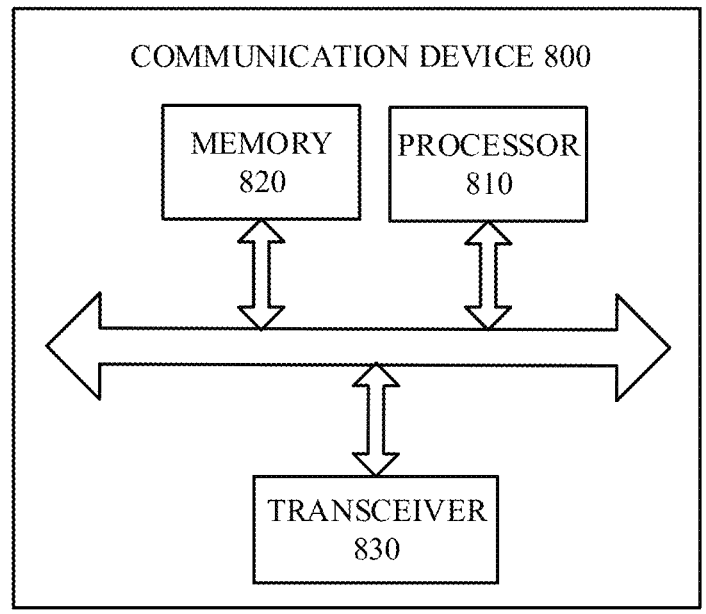
FIG. 6 is a schematic structural diagram of a communication device 800 provided in implementations of the disclosure.

FIG. 6 is a schematic structural diagram of a communication device 800 provided in implementations of the disclosure. The communication device 800 illustrated in FIG. 6 includes a processor 810. The processor 810 can invoke and execute computer programs stored in a memory, to perform the method in implementations of the disclosure.

Optionally, as illustrated in FIG. 6, the communication device 800 may further include the memory 820. The processor 810 can invoke and execute the computer programs stored in the memory 820, to perform the method in implementations of the disclosure.

The memory 820 may be a separate device independent of the processor 810, or may be integrated into the processor 810 of the disclosure.

Optionally, as illustrated in FIG. 6, the communication device 800 can further include a transceiver 830. The processor 810 can control the transceiver 830 to communicate with other devices, specifically, to transmit information or data to other devices or to receive information or data transmitted by other devices.

The transceiver 830 may include a transmitter and a receiver. The transceiver 830 may further include an antenna, where one or more antennas can be provided.

Optionally, the communication device 800 may be operable as the network device in implementations of the disclosure, and the communication device 800 can implement the operations performed by the network device in various methods in implementations of the disclosure, which will not be repeated herein for the sake of simplicity.

Optionally, the communication device 800 may be operable as the mobile terminal/the terminal device in implementations of the disclosure, and the communication device 800 can implement the operations performed by the mobile terminal/the terminal device in various methods in implementations of the disclosure, which will not be repeated herein for the sake of simplicity.

Figure 7:
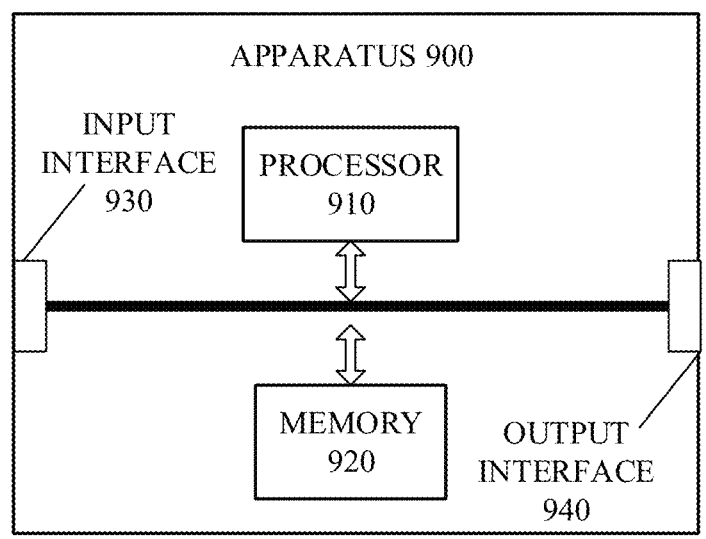
FIG. 7 is a schematic structural diagram of an apparatus according to implementations of the disclosure.

FIG. 7 is a schematic structural diagram of an apparatus according to implementations of the disclosure. The apparatus 900 illustrated in FIG. 7 includes a processor 910. The processor 910 can invoke and execute computer programs stored in a memory to perform the method in implementations of the disclosure.

Optionally, as illustrated in FIG. 7, the apparatus 900 further includes the memory 920. The processor 910 can invoke and execute the computer programs stored in the memory 920 to perform the method in implementations of the disclosure.

The memory 920 may be a separate device independent of the processor 910, or may be integrated into the processor 910.

Optionally, the apparatus 900 may further include an input interface 930. The processor 910 can control the input interface 930 to communicate with other devices or chips, specifically, to obtain information or data transmitted by other devices or chips.

Optionally, the apparatus 900 may further include an output interface 940. The processor 910 can control the output interface 940 to communicate with other devices or chips, specifically, to output information or data to other devices or chips. The input interface 930 and the output interface 940 can be integrated as a transceiver.

Optionally, the apparatus is applicable to the network device in implementations of the disclosure. The apparatus can implement the operations performed by the network device in various methods in implementations of the disclosure, which will not be repeated herein for the sake of simplicity.

Optionally, the apparatus is applicable to the mobile terminal/the terminal device in implementations of the disclosure. The apparatus can implement the operations performed by the mobile terminal/the terminal device in various methods in implementations in the disclosure, which will not be repeated herein for the sake of simplicity.

Optionally, the apparatus referred to in implementations of the disclosure may also be a chip, which may be, for example, an SOC.

Figure 8:
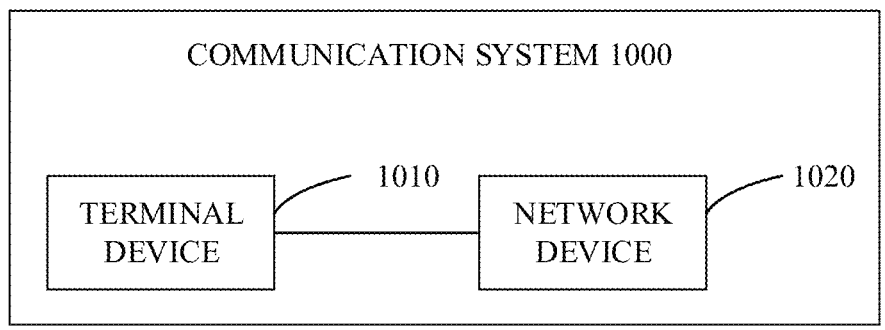
FIG. 8 is a schematic block diagram of a communication system 1000 provided in implementations of the disclosure.

FIG. 8 is a schematic block diagram of a communication system 1000 provided in implementations of the disclosure. As illustrated in FIG. 8, the communication system 1000 includes a terminal device 1010 and a network device 1020.

The terminal device 1010 can implement functions of the terminal device in the foregoing methods, and the network device 1020 can implement functions of the network device in the foregoing methods, which will not be repeated herein for the sake of simplicity.

It should be understood that, the processor in implementations of the disclosure may be an integrated circuit chip with signal processing capabilities. During implementation, each step of the foregoing method implementations may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations of the disclosure can be implemented or executed. The general purpose processor may be a microprocessor, or the processor may be any conventional processor or the like. The steps of the method disclosed in implementations of the disclosure may be directly implemented by a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory in implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DR RAM). It should be noted that, the memory of the systems and methods described in the disclosure is intended to include, but is not limited to, these and any other suitable types of memory.

It should be understood that, the memory above is intended for illustration rather than limitation. For example, the memory in implementations of the disclosure may also be an SRAM, a DRAM, an SDRAM, a DDR SDRAM, an ESDRAM, an SLDRAM, a DR RAM, etc. In other words, the memory in implementations of the disclosure is intended to include, but is not limited to, these and any other suitable types of memory.

Implementations of the disclosure further provide a computer-readable storage medium. The computer-readable storage medium is configured to store computer programs.

Optionally, the computer-readable storage medium is applicable to the network device of implementations of the disclosure. The computer programs are operable with a computer to implement the operations performed by the network device in various methods in implementations of the disclosure, which will not be repeated herein for the sake of simplicity.

Optionally, the computer-readable storage medium is applicable to the mobile terminal/the terminal device of implementations of the disclosure. The computer programs are operable with a computer to implement the operations performed by the mobile terminal/the terminal device in various methods in implementations of the disclosure, which will not be repeated herein for the sake of simplicity.

Implementations of the disclosure further provide a computer program product. The computer program product includes computer program instructions.

Optionally, the computer program product is applicable to the network device of implementations of the disclosure. The computer program instructions are operable with a computer to implement the operations performed by the network device in various methods in implementations of the disclosure, which will not be repeated herein for the sake of simplicity.

Optionally, the computer program product is applicable to the mobile terminal/the terminal device of implementations of the disclosure. The computer program instructions are operable with a computer to implement the operations performed by the mobile terminal/the terminal device in various methods in implementations of the disclosure, which will not be repeated herein for the sake of simplicity.

Implementations of the disclosure further provide a computer program.

Optionally, the computer program is applicable to the network device of implementations of the disclosure. The computer program, when executed by a computer, is operable with the computer to implement the operations performed by the network device in various methods in implementations of the disclosure, which will not be repeated herein for the sake of simplicity.

Optionally, the computer program is applicable to the mobile terminal/the terminal device of implementations of the disclosure. The computer program, when executed by a computer, is operable with the computer to implement the operations performed by the mobile terminal/the terminal device in various methods in implementations of the disclosure, which will not be repeated herein for the sake of simplicity.

Those of ordinary skill in the art will appreciate that units and algorithmic operations of various examples described in connection with implementations of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the specific working processes of the foregoing systems, apparatuses, and units, reference can be made to the corresponding processes of the above method implementations, which will not be repeated herein.

It will be appreciated that the systems, apparatuses, and methods disclosed in implementations of the disclosure may also be implemented in various other manners. For example, the above apparatus implementations are merely illustrative, e.g., the division of units is only a division of logical functions, and there may be other manners of division available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise. Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various implementations of the disclosure may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations of the disclosure. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wireless communication method, performed by a terminal device, comprising:
    transmitting, first slice-related information to a network device according to a random-access parameter value, the first slice-related information being carried in Msg 1 of a random access procedure, and the first slice-related information indicating a network slice supported by the terminal device, wherein different first slice-related information corresponds to different random access resources, and the random access resource comprises a random access preamble; and
    wherein before transmitting the first slice-related information, the method further comprises:
    receiving second slice-related information broadcast by the network device, wherein the second slice-related information indicates at least one network slice supported by the network device, wherein the second slice-related information comprises: a correspondence between at least one random-access parameter value and at least one network slice, and a correspondence between at least one random-access parameter value and at least one random access resource;
    determining the at least one network slice supported by the network device according to the second slice-related information; and
    selecting the network slice supported by the terminal device from the at least one network slice supported by the network device;
    wherein the random-access parameter value comprises a backoff parameter value and a power-ramping parameter value, and the backoff parameter value and the power-ramping parameter value is an absolute value, a relative value, or an adjustment value.

2. The method of claim 1, further comprising:
    receiving, by the terminal device, access-control information transmitted by the network device.

3. The method of claim 2, further comprising at least one of:
    determining, by the terminal device, a random-access result according to the access-control information;
    performing, by the terminal device, random access according to the access-control information;
    determining, by the terminal device, information for cell selection or cell reselection according to the access-control information;
    performing, by the terminal device, cell selection or cell reselection according to the access-control information; or
    determining, by the terminal device, a radio resource control (RRC) state according to the access-control information.

4. The method of claim 3, wherein the access-control information comprises at least one of:
    a correspondence between at least one random-access parameter value and at least one network slice; or
    a correspondence between at least one random-access parameter value and at least one random access resource.

5. The method of claim 1, wherein the random access resource comprises at least one of a time domain resource, a frequency-domain resource, or a code-domain resource for a physical random access channel (PRACH).

6. A wireless communication method, performed by a network device, comprising:
    receiving first slice-related information transmitted by a terminal device according to a random-access parameter value, the first slice-related information being carried in Msg 1 of a random access procedure, and the first slice-related information indicating a network slice supported by the terminal device, wherein different first slice-related information corresponds to different random access resources, and the random access resource comprises a random access preamble; and
    wherein before transmitting the first slice-related information, the method further comprises:
    broadcasting second slice-related information to the terminal device, wherein the second slice-related information indicates at least one network slice supported by the network device, wherein the second slice-related information comprises: a correspondence between at least one random-access parameter value and at least one network slice, and a correspondence between at least one random-access parameter value and at least one random access resource;
    wherein the at least one network slice supported by the network device is determined by the terminal device according to the second slice-related information; and
    wherein the network slice supported by the terminal device is selected by the terminal device from the at least one network slice supported by the network device;
    wherein the random-access parameter value comprises a backoff parameter value and a power-ramping parameter value, and the backoff parameter value and the power-ramping parameter value is an absolute value, a relative value, or an adjustment value.

7. The method of claim 6, further comprising:
    transmitting, by the network device, access-control information to the terminal device.

8. The method of claim 7, further comprising at least one of:
    the access-control information is used for determining a random-access result;
    the access-control information is used for the terminal device to perform random access;
    the access-control information is used for determining information for cell selection or cell reselection;
    the access-control information is used for the terminal device to perform cell selection or cell reselection; or
    the access-control information is used for determining a radio resource control (RRC) state.

9. The method of claim 8, wherein the access-control information comprises at least one of:
    a correspondence between at least one random-access parameter value and at least one network slice; or
    a correspondence between at least one random-access parameter value and at least one random access resource.

10. The method of claim 6, further comprising:

transmitting, by the network device, indication information to the terminal device, wherein the indication information indicates the random-access parameter value or indicates the random-access parameter value selected.

11. A terminal device, comprising:

a transceiver;

a processor; and a memory storing a computer program which, when executed by the processor, are operable with the processor to:

cause the transceiver to transmit first slice-related information to a network device according to a random-access parameter value, the first slice-related information being carried in Msg 1 of a random access procedure, and the first slice-related information indicating a network slice supported by the terminal device, wherein different first slice-related information corresponds to different random access resources, and the random access resource comprises a random access preamble;

wherein before receiving the first slice-related information, the processor is further configured to:

receive second slice-related information broadcast by the network device, wherein the second slice-related information indicates at least one network slice supported by the network device, wherein the second slice-related information comprises: a correspondence between at least one random-access parameter value and at least one network slice, and a correspondence between at least one random-access parameter value and at least one random access resource;

determine the at least one network slice supported by the network device according to the second slice-related information; and select the network slice supported by the terminal device from the at least one network slice supported by the network device;

wherein the random-access parameter value comprises a backoff parameter value and a power-ramping parameter value, and the backoff parameter value and the power-ramping parameter value is an absolute value, a relative value, or an adjustment value.

12. The terminal device of claim 11, wherein the transceiver is further configured to:

receive access-control information transmitted by the network device.

13. The terminal device of claim 12, wherein the processor is further configured to perform at least one of:

determining a random-access result according to the access-control information;

performing random access according to the access-control information;

determining information for cell selection or cell reselection according to the access-control information;

performing cell selection or cell reselection according to the access-control information; or determining a radio resource control (RRC) state according to the access-control information.

14. The terminal device of claim 13, wherein the access-control information comprises at least one of:

a correspondence between at least one random-access parameter value and at least one network slice; or a correspondence between at least one random-access parameter value and at least one random access resource.

15. The terminal device of claim 11, wherein the random access resource further comprises at least one of a time-domain resource, a frequency-domain resource, or a code-domain resource for a physical random access channel (PRACH).

* * * * *